United States Patent [19]
Fleming et al.

[11] 3,902,807
[45] Sept. 2, 1975

[54] METHOD FOR OPERATING AN ATTENUATED TOTAL REFLECTION INFRARED SYSTEM

[75] Inventors: Sydney Winn Fleming; Wallace Wen-Chuan Yau, both of Wilmington, Del.

[73] Assignee: E. I. Du Pont de Nemours and Company, Wilmington, Del.

[22] Filed: Oct. 25, 1973

[21] Appl. No.: 409,379

[52] U.S. Cl. .................. 356/74; 250/343; 356/51
[51] Int. Cl.² ................... G01J 3/42; G01N 21/26
[58] Field of Search .................. 356/51, 74, 96; 250/343–345

[56] References Cited
UNITED STATES PATENTS
3,803,384  4/1974  Braunlich .................. 250/345

Primary Examiner—Ronald L. Wibert
Assistant Examiner—F. L. Evans

[57] ABSTRACT

In a method for operating an attenuated total reflection infrared system for measuring the concentration of a constituent in a liquid process stream wherein a sample of the stream is irradiated with a beam of radiation at a wavelength, corresponding to the characteristic absorption wavelength of the constituent, the improvement comprises intentionally irradiating the sample with a beam of radiation at a wavelength longer than the characteristic absorption wavelength of the constituent.

5 Claims, 14 Drawing Figures

PATENTED SEP 2 1975 3,902,807

SHEET 1

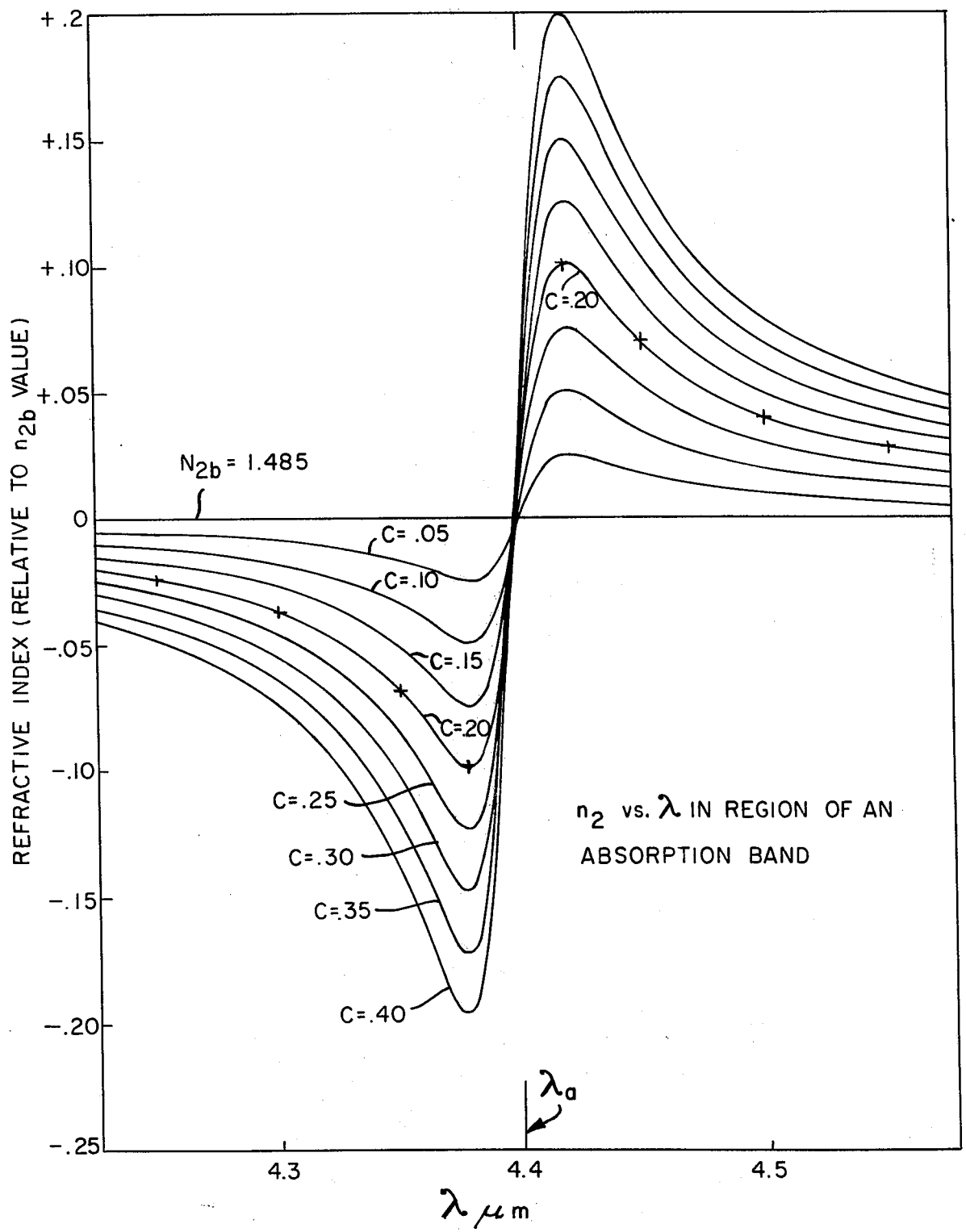

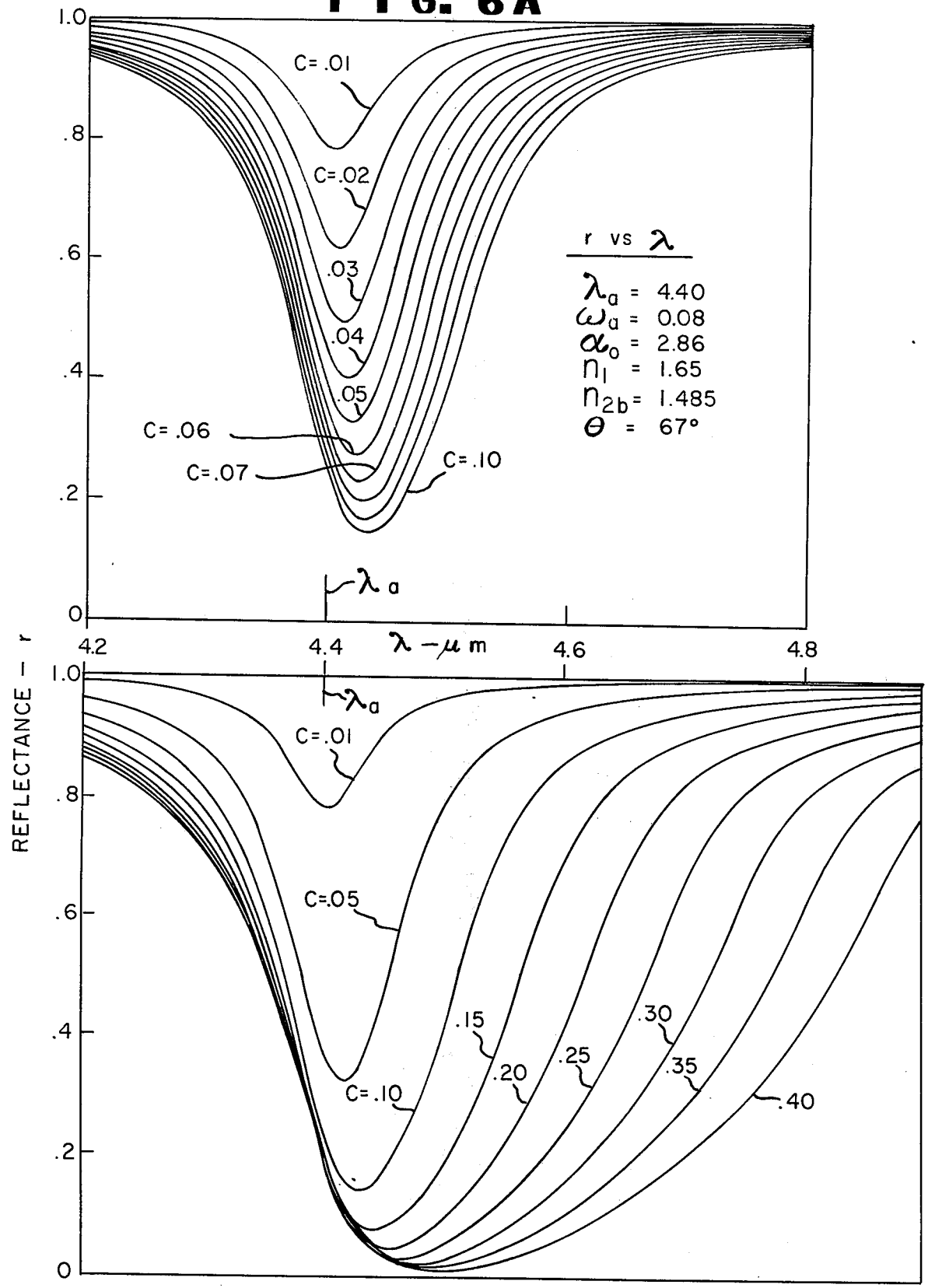

METHOD FOR OPERATING AN ATTENUATED TOTAL REFLECTION INFRARED SYSTEM

BACKGROUND OF THE INVENTION

This invention relates to a method for on-stream monitoring of the concentration of a preselected constituent in a liquid process stream where the concentration of this constituent is measurable by means of infrared radiation absorption determinations. More specifically, this invention concerns an infrared (IR) process monitoring system employing an improved attenuated total reflection (ATR) technique and a method for selecting this improvement to provide increased measurement sensitivity.

Infrared absorption techniques have in the past found extensive application for a variety of process monitoring activities. Spectrographic analysis of materials in the infrared region has been found to be a very useful analysis tool. Specific absorption bands for constituents in a sample are characteristic of each constituent so that photometric analysis of a sample at the wavelength of a particular absorption band characteristic of the constituent of interest has been the technique used in many analytical instruments. This type of analysis has until very recently generally been limited almost entirely to the near-infrared region of the spectrum (1–3 micrometers) because most mid-infrared absorption bands (3–10 micrometers) are too intense to permit transmission measurements at normal process concentrations. More recently an instrument employing the principle of attenuated total reflection (ATR) has enabled the use of the mid-infrared range of wavelengths where more intense and definitive absorption bands are generally available and without the necessity of employing excessively thin sample configurations. When applied to the monitoring of a process stream and the associated control of an end product, this ATR-IR technique has exhibited sensitivity which was equivalent to the sensitivity which was realizable only through pre-existing laboratory analysis. However, in order to further improve the precision of process control, increased sensitivity of the ATR-IR monitoring technique was considered important.

SUMMARY OF THE INVENTION

The improvement in the sensitivity of measurement, by an ATR-IR system, of the concentration of a constituent in a process stream is achieved by intentionally irradiating a sample with a beam of radiation at a wavelength which is appropriately longer than the characteristic absorption band wavelength for that particular constituent. This intentional shift in the wavelength of the sample irradiation is achieved by employing a filter with a peak wavelength which is longer than the absorption peak wavelength for the constituent under evaluation.

The selection of the wavelength offset in the filter might be done empirically. However, this would require an expensive array of filters and excessive time in gathering and evaluating experimental data for each concentration range for each chemical constituent to be monitored.

A novel feature of this invention is the technique for selecting the appropriate wavelength difference between the transmission peak of the filter and the absorption peak of the absorption band of the chemical constituent to be monitored. This technique comprises calculations of the ATR-IR responses as a function of wavelength for values of concentrations of the solution constituent which is to be monitored.

BRIEF DESCRIPTION OF THE DRAWINGS

FIG. 5A is a plot of refractive index versus wavelength showing the excursion ranges of refractive index in the region of a strong absorptiion band, the several curves being for varied levels of solution concentration;

FIG. 6A is a plot of reflectance versus wavelength for values of concentration ranging from 1 to 20% (the upper set for 1–10% with 1% intervals and the lower set for 1–40% with 5% intervals), the data being calculated for the values of $\lambda_a$, $\omega_a$, $\alpha_o$, $n$, and $n_{2b}$, as shown;

DESCRIPTION OF THE PREFERRED EMBODIMENT

Figure 1:
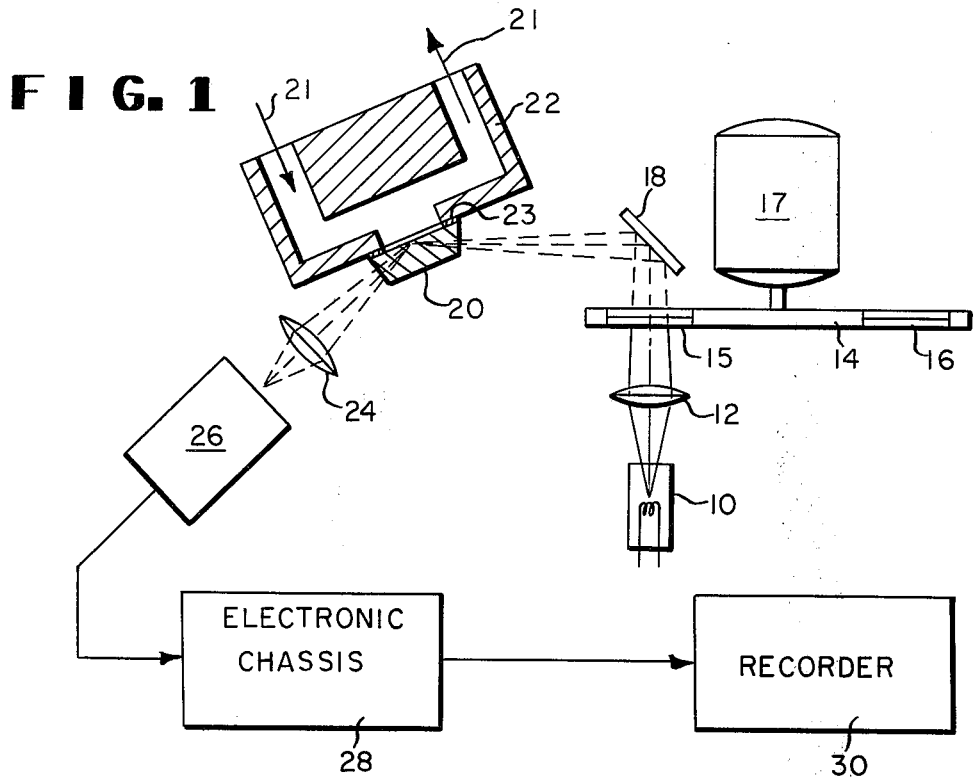
FIGS. 1 and 1A illustrate schematically a typical prior art ATR-IR monitor to which this invention is applicable.

Referring to FIG. 1, the apparatus utilized in the practice of this invention is an infrared photometer arranged to employ the principle of attenuated total reflection (ATR) in a sample cell. Typically, it comprises an infrared source of radiation 10, optical focusing means 12 and a chopper and filter wheel 14 containing two filters 15 and 16. The chopper wheel 14 is mounted on a shaft for rotation by motor 17 and arranged so that filters 15 and 16 alternately intersect the beam of radiation coming from the source 10. A mirror 18 is placed to reflect radiation coming through the filters on toward the input face of a prism 20. The reflection face of prism 20 is sealed to analyzer sample cell 22 via gasket 23. The reflection face is located and used as the window of sample cell 22. The output face of prism 20 passes the reflected light beam through optics 24 and into photoelectric detector 26. Detector 26 is electrically connected to an electronic chassis 28 which comprises amplifiers, a wave shaping circuit connected to a magnetic pickup adjacent the chopper and a demodulator circuit in order to provide a signal to a recorder 30. The signal is a function of the concentration of the material 21 being monitored as it passes through the sample cell 22. In order to make the apparatus suitable for monitoring process fluids at elevated temperatures in a commercial manufacturing plant, the choice of material for prism 20 is important. In the case of the preferred embodiment, the prism material was chosen to be sapphire since it stands temperatures in excess of 1000°C., has good mechanical strength and is chemically inert. In addition, as will be discussed later, it has an index of refraction value, $n_1$, which is larger than the index of refraction of the process fluid to be monitored. In the particular case discussed below, a single reflecting prism was employed. However, in other applications, multiple reflection prisms have been employed to advantage. For example, a prism having a total of 12 reflections was used in an instrument for monitoring the concentration of polyacrylonitrile in dimethylformamide.

Figure 1A:
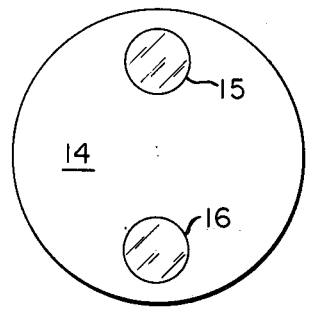

The present invention will be illustrated specifically in terms of a process monitor for precise measurement of the concentration of methylene diphenyl isocyanate (MDI) in a reactive mixture with polyether glycol (PEG). Furthermore, the preferred embodiment employs a two wavelength sample analysis technique (as indicated by the two filters 15, 16 in the chopper 14 of FIG. 1A. In an alternate embodiment, the filter wheel 14 could be located in the light path between prism 20 and detector 26. In this case, the radiation from the sample would be analyzed at a wavelength longer than the characteristic absorption wavelength as described for the preferred embodiment. In accordance with prior art practice one wavelength (the analytical) is selected corresponding to the absorption band wavelength for the chemical constituent whose concentration is to be monitored. The other wavelength (a reference) differs from that of the absorption band and provides compensation for radiation intensity changes in the source or for contaminant materials, e.g., water in some process streams which might affect both wavelengths essentially the same. However, single wavelength photometer systems can also be adapted to irradiate the ATR sample cell and measure the concentration changes in the process stream. Both types of systems can be made to give improved response through the use of the present invention as described below.

Figure 2:
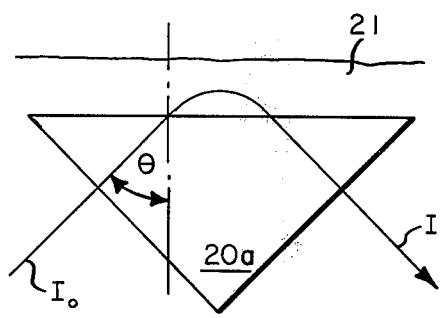
FIG. 2 is an optical ray diagram for a single reflection prism used in the preferred embodiment of the ATR instrument.

The ATR principle which permits a sample under measurement to be optically thin without being physically thin, makes use of the fact that a beam of radiation in a dense optical medium (prism 20) can be totally reflected at an interface, at an angle of incidence greater than the critical angle, and still be attenuated through interaction of the evanescent wave with an adjacent optically less dense medium (sample). As illustrated in FIG. 2 (not a completely exact illustration but one useful for illustration) an incident beam $I_o$ is projected into prism 20a at an angle of incidence $\theta$, is reflected at the interface between the prism with an index of refraction $n_1$ and a less dense medium 21 with an index of refraction $n_2$ and then appears as reflected beam I. If the less dense medium 21 is completely transparent, no energy is lost on reflection and the full intensity of the beam is returned to the denser medium (prism 20a). If, however, the less dense medium exhibits absorption at the wavelength of the incident beam $I_o$ of radiation, attenuation will occur just as though the beam had been transmitted through a thin section of the sample material being monitored. This reduction in energy is sensed in the reflected beam I as described above. The evanescent wave ordinarily penetrates into the second medium only a fraction of a wavelength and, therefore, attenuation is typically small for a cell using the ATR principle as compared to a cell using the transmission principle. Multiple reflection prisms as noted above are sometimes used to provide an increase in effective sample thickness and dispersion effects both of which can provide improved sensitivity. However, multiple reflections normally require a longer optical path through the prism entailing a loss in transmission which can offset part of the gain. Thus, prism choice is a compromise of these considerations and of the ease of mounting in the sample cell. In the preferred embodiment described below, a single reflection prism is employed.

Figure 3:
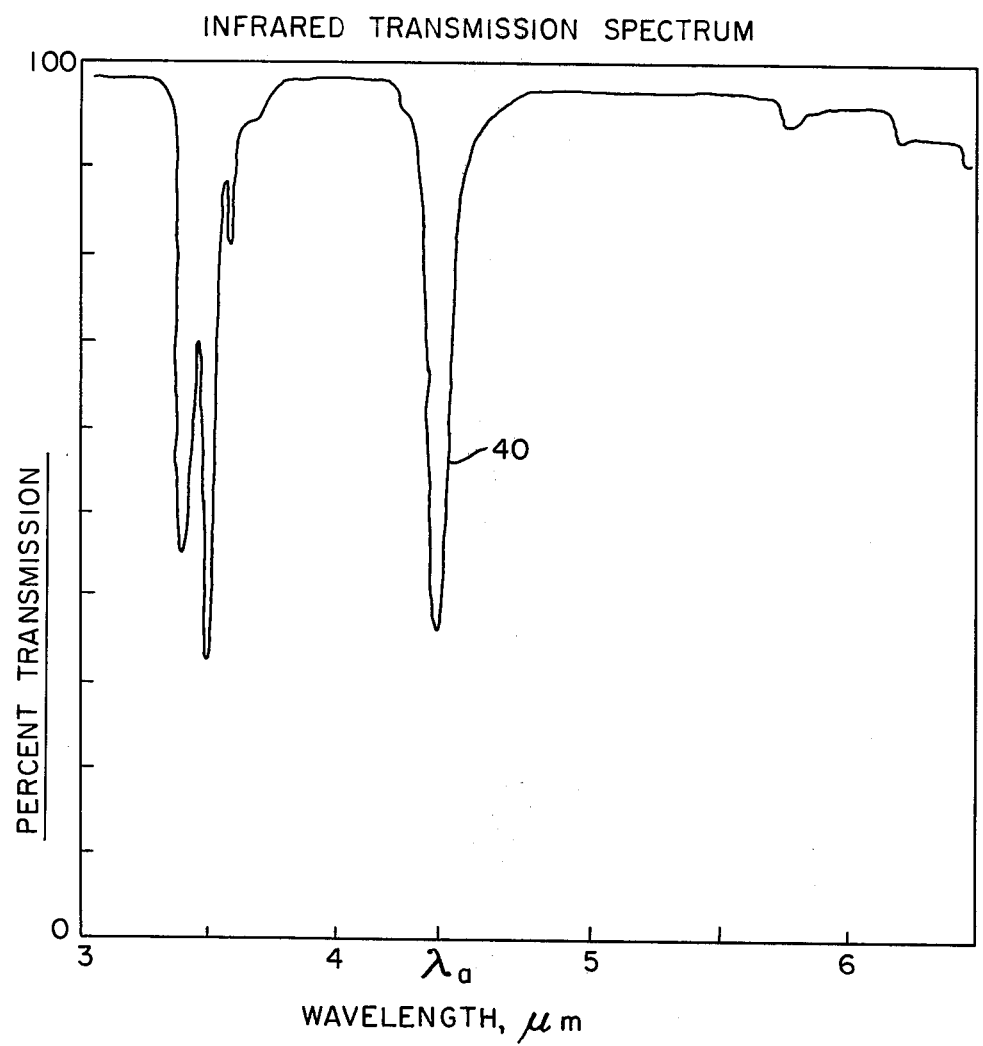
FIG. 3 is an infrared transmission spectrum characteristic of methylene diphenyl isocyanate/polyether glycol (MDI/PEG) solutions illustrative of an application of this invention.

The present invention uses an analytical filter 15 (FIG. 1A) which provides intentionally adjusted radiation with a peak wavelength longer than the known or typical absorption band peak wavelength of the solution constituent which is being monitored. In the illustrative case to be discussed below, the transmission spectrum as shown in FIG. 3 contains an absorption band 40 which has a peak wavelength $\lambda_a$ as shown. The selection of the wavelength offset for the analyzing filter is based on computations of the effect of changes in attenuation of an internally reflected beam which results from refractive index dispersion in the region of such an absorption band. Detailed description of this method follows.

Figures 4A, 4B:
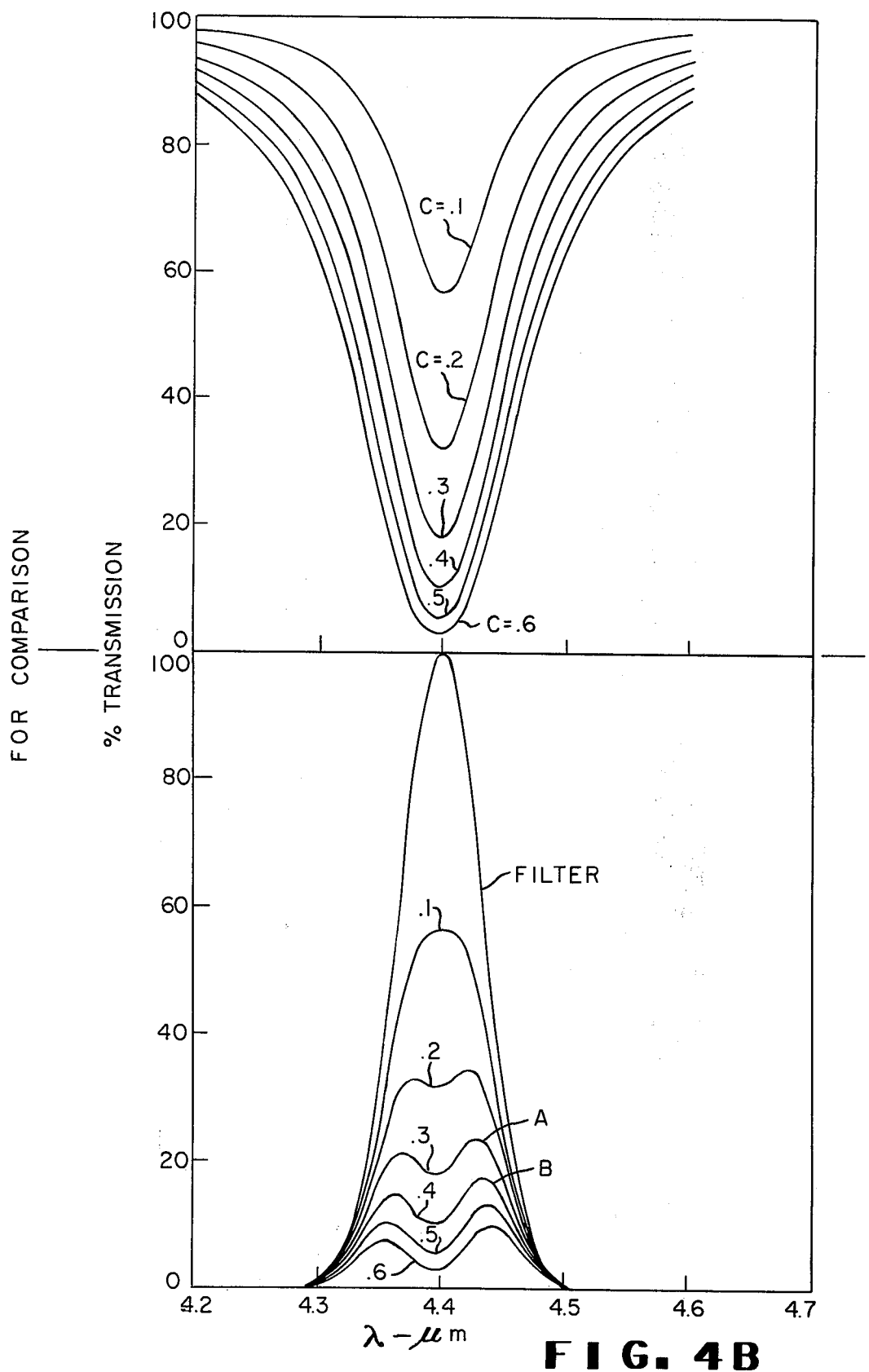
FIG. 4A is a typical plot of transmission curves versus wavelength showing changes to be expected for various concentration levels of MDI according to the Lambert-Beer law. The concentration levels are expressed decimally and range from 10 to 60 percent.
FIG. 4B shows a typical filter transmission curve and combined filter and solution transmission curves for varied concentration levels of MDI expressed decimally plotted on the same wavelength scale as FIG. 4A and placed in line just below the curves of FIG. 4A for comparison purposes.

In FIG. 4A are typical transmission curves showing changes expected for various concentration levels according to the Lambert-Beer Law: $I/I_o = e^{-\alpha_o\,ct}$ where $I/I_o$ is the ratio of transmitted incident radiation intensity, $\alpha_o$ is the absorption coefficient at the peak absorption wavelength, C is the concentration in volume percent expressed decimally of the absorbing constituent to be monitored and $t$ is the thickness of the sample through which radiation passes (in this case, calculated for a cell thickness of 1 micrometer).

FIG. 4B is drawn immediately below FIG. 4A on the same wavelength scale. This plot shows, first, the transmission curve for a filter having a peak transmission at the same wavelength as that of the transmission curves of the absorbing medium shown in FIG. 4A above. It is apparent then that, as concentration increases (e.g., C going from 0.1 to 0.6), the area under the combined curves such as curve A (for the filter plus 0.3 concentration) or B (filter plus 0.4 concentration) it is reduced. This area represents the energy which would be transmitted through a sample cell. Sensing this energy level provides the means which has in the past commonly been employed for determining concentration in an absorbing medium.

Since ATR involves the interaction of the "evanescent" wave, shown in FIG. 2 above, with sample material in contact with the prism, the dispersive effects of the absorbing sample material have been found to be significant. This significance can be visualized by examination of FIG. 5A which shows the change in refractive index, $n_2$ of an absorbing medium in the spectral range of an absorption band. Total reflection in the prism occurs when the angle of incidence $\theta$ exceeds the critical angle $\theta_c$ where, for the FIG. 2 case, $\sin \theta_c = n_2/n_1$. FIG. 5A shows the excursion ranges of $n_2$ as a function of wavelength in the region of a strong absorption band. Specifically, these functions were calculated for concentration ranges of MDI as indicated on the figure. The absorption peak for MDI is nominally at 4.40 $\mu$m. At a 0.20 concentration the $n_2$ value at shorter wavelengths departs from a norm or base line value of 1.485 to a value 7% lower (1.385), passes through the base-line value ($n_{2b}$) of 1.485 at the absorption peak ($\lambda_a = 4.40$ $\mu$m) then rises to a value 7% higher (1.585) at a wavelength longer than $\lambda_a$ before approaching the $n_{2b}$ value at still longer wavelengths.

The effects of these variations in refractive index of the sample ($n_2$) are clearly demonstrated by examining plotted values computed for penetration depth $d_p$ as shown below. It has been found that the penetration depth of the evanescent wave is given by the expression:

$$d_p = \frac{\lambda}{2\pi n_1 (\sin^2\theta - n_{21}^2)^{1/2}}$$

where $n_{21} = n_2/n_1$.

Figure 5B:
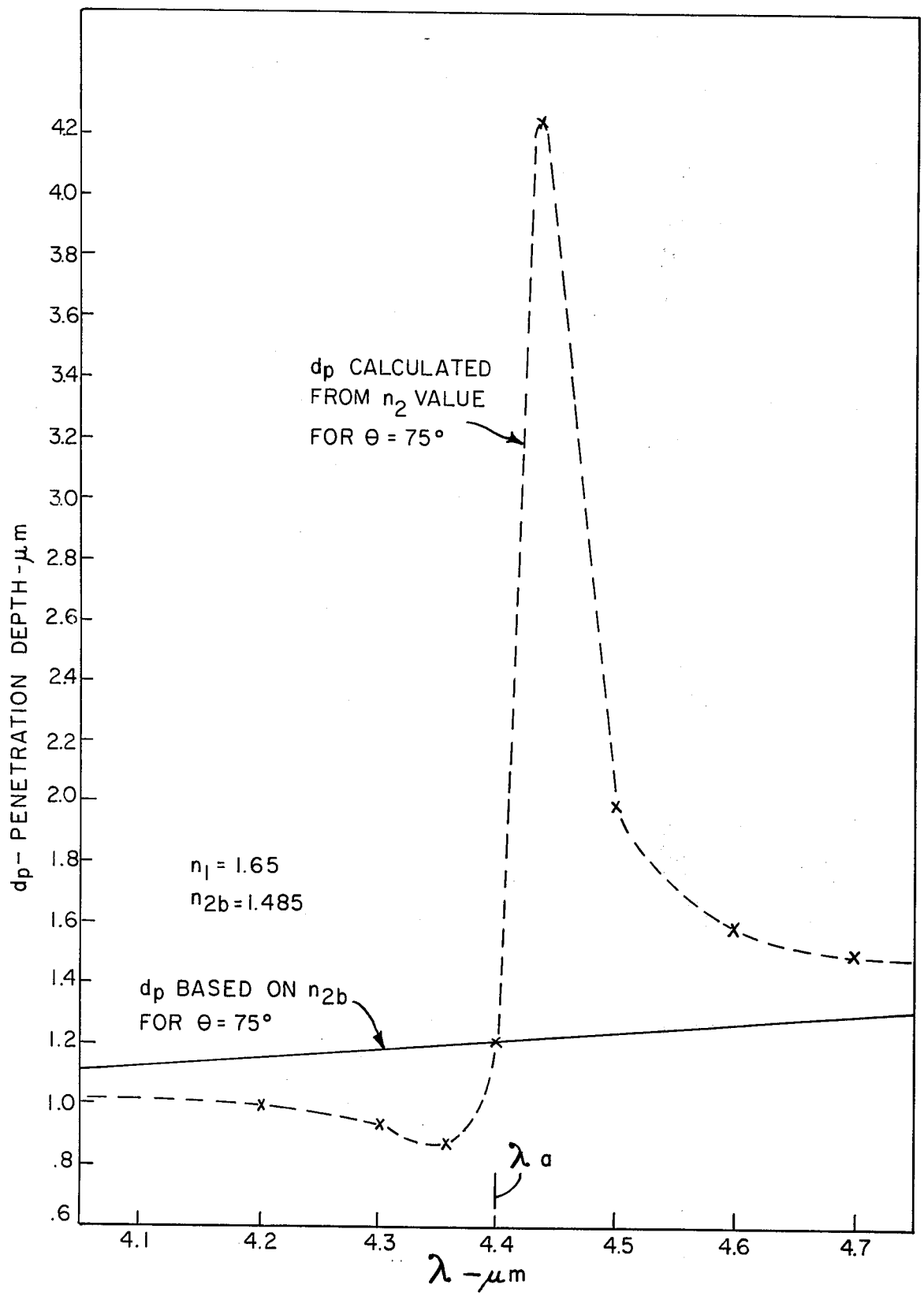
FIG. 5B is a double plot of penetration depth (dp) as a function of wavelength first on the assumption that the index of refraction remains at a base-line value which results in the plot shown as a solid line and a second plot where values of dp are calculated on the basis of change in index of refraction of the solution as a function of wavelength which second plot is shown as a dashed line in this figure.

The intensity of the evanescent wave decreases exponentially from the surface. The value of $d_p$ given by the above expression is that distance at which the energy has fallen to the fraction $1/e$ of its value at the surface. This penetration depth for the parameters of the illustration example (sapphire prism and MDI solution) is shown in FIG. 5B. First, the solid line shows the value of $d_p$ calculated under the assumption that the index of refraction of the MDI solution is constant at a base line value $n_{2b}$ for the concentration selected in this example (0.20) and for an angle of incidence of the radiation of 75°. However, for this same situation, the values of $d_p$ which take into account the change in index of refraction $n_2$ shown in FIG. 5A will vary as shown as the dashed line of FIG. 5B. From this it is apparent that at wavelengths longer than $\lambda_a$ there is much greater penetration into the sample than at wavelengths shorter than $\lambda_a$. Thus, there is a much greater penetration into the sample at these longer wavelengths where the $n_2$ value approaches that of the prism. Thus, the sample is significantly more absorbent than at wavelengths shorter than $\lambda_a$ consequently the effective absorption conditions which result will not be the same as those illustrated in FIG. 4B.

This can be more clearly understood and defined by following a more complete analysis of the effect of dispersion in the reflection of an absorbing medium. A method results from this analysis whereby the characteristics of an analyzing filter can be selected to provide improved instrument sensitivity. As noted above, consideration of the changes in attenuation of an internally reflected beam which result from refractive index dispersion in the region of an absorption band enables improved response through irradiation of the sample with energy from a source employing a filter selected with a peak wavelength which is longer than that of the absorption peak. These considerations also provide a method for selecting this wavelength offset. The analysis supporting these considerations follow:

REFLECTION FROM AN ABSORBING MEDIUM

In a dispersive, absorbing medium, the refractive index $n'_2$ is complex and can be written as:

$$n'_2 = n_2(l - i_\kappa) \quad (2)$$

where $n_2$ is the real part of the refractive index of the absorbing medium and is the absorption index. This latter term, , is related to the absorption coefficient, $\alpha_o$ of Equation 1 as follows:

$$\alpha_o = \frac{4\pi n_2 \kappa}{\lambda} \quad (3)$$

in which $\lambda$ denotes the wavelength of radiation in vacuum.

By using this complex refractive index in Fresnel's Law, the reflectance ratio after one reflection at an interface has been derived by I. Simon (J. Opt. Soc. Am. 41, 336, 1951), and in Wendlant and Hecht's book *Reflectance Spectroscopy*, Interscience Publisher, N.Y., 1966. Note in these references, there is an error in the expression for (a) or $P_2$, by a factor of 2 which is corrected for in Equation (6). The results are as follows:

$$r_\perp = \frac{a^2 + b^2 - 2a\cos\theta + \cos^2\theta}{a^2 + b^2 + 2a\cos\theta + \cos^2\theta} \quad (4a)$$

$$r_\parallel = \frac{a^2 + b^2 - 2a\sin\theta\tan\theta + \sin^2\theta\tan^2\theta}{a^2 + b^2 + 2a\sin\theta\tan\theta + \sin^2\theta\tan^2\theta} \quad (4b)$$

and $r_{natural} = \frac{1}{2}(r_\perp + r_\parallel)$ (4c)

where $\theta$ = the angle of incidence, $r_\perp$, $r_\parallel$ = the ratio of light intensity after a single reflection to the intensity of incident light with polarization perpendicular and parallel to the reflecting interface, respectively, $r_{natural}$ = single reflectance ratio for unpolarized light.

The quantities $(a^2 + b^2)$ and $(a)$ are related to $n_2$, $n_1$ and $\theta$ as follows:

$$P_1 \equiv (a^2+b^2) = \frac{1}{2}[n_{21}^2(1-\kappa^2)-\sin^2\theta] + \{\frac{1}{2}[n_{21}^2(1-\kappa^2)-\sin^2\theta]^2 + 4n_{21}^4\kappa^2\}^{1/2}$$

$$+ \frac{2n_{21}^4\kappa^2}{[n_{21}^2(1-\kappa^2)-\sin^2\theta] + \{[n_{21}^2(1-\kappa^2)-\sin^2\theta]^2 + 4n_{21}^4\kappa^2\}^{1/2}} \quad (5)$$

and $$P_2 \equiv a = (\tfrac{1}{2}[n_{21}^2(1-\kappa^2)-\sin^2\theta] + \tfrac{1}{2}\{[n_{21}^2(1-\kappa^2)-\sin^2\theta]^2 + 4n_{21}^4\kappa^2\}) \quad (6)$$

where, as defined previously, $n_{21} \equiv n_2/n_1$;
$n_2$ is the refractive index of the absorbing medium and $n_1$ is the refractive index of the first medium (the ATR crystal) which is essentially not an absorbing medium in an ATR analyzer. $P_1$ and $P_2$ will be referred to as first and second reduced parameters, respectively.

For the case of multiple reflections which are often used in an ATR analyzer, the overall reflectance ratio R can be written as follows:

$$R_\perp = r_\perp^k \quad (7a)$$

$$R_\parallel = r_\parallel^k \quad (7b)$$

$$R_{natural} = \tfrac{1}{2}(R_\perp + R_\parallel) \quad (7c)$$

where $k$ = number of reflections.

Equations 1 through 7 permit one to determine reflectance ratios in terms of known values of $n_2$ and $\kappa$. In order to describe internal reflection in the region of an absorption band adequately, the variation of $n_2$ and $\kappa$ in this region must be included in the above analysis. Since, as mentioned supra, $n_2$, in particular, in exceedingly difficult to measure in an absorption band, the following derivation was developed to provide a means for predicting $n_2$ from measurable quantities.

COMPLEX REFRACTIVE INDEX AT AN ABSORPTION BAND

From the classical dispersion theory, the following relation can be predicted:

$$(n_2')^2 = (n_{2b})^2 + \frac{B}{(\omega_o^2 - \omega^2) + i\Gamma\omega} \quad (8)$$

where
$n_{2b}$ = baseline refractive index at $\omega_o$ interpolated from measured values on either side of the absorption band, $$B = \frac{4\pi e^2 fN}{m}, \text{ with}$$

$e, m$ = the charge and the mass of the electron,
$f, N$ = the strength and the number of oscillators,
$\omega_o, \Gamma$ = peak frequency and half-width of absorption band (in wave number units), measured at low concentration, and
$\omega$ = variable frequency.

Separating the real and imaginary parts of Equation (8) gives the following:

$$n_2^2(1-\kappa^2) = (n_{2b})^2 + \frac{B(\omega_o^2 - \omega^2)}{(\omega_o^2 - \omega^2)^2 + (\Gamma\omega)^2} \quad (9)$$

and $$n_2^2 = \kappa \frac{B\Gamma(\omega/2)}{(\omega_o^2 - \omega^2)^2 + (\Gamma\omega)^2} \quad (10)$$

It has been observed that the quantity B relates very simply to the extinction coefficient of a dilute solution of the absorbing species. It can be determined from an IR transmission measurement of a dilute solution. (The dilute solution concentration level should be chosen such that, with a convenient cell thickness, a transmission reading in the mid-range, e.g., 40–60%, of the instrument results. With the absorption band being weak for a dilute solution, the refractive index dispersion is small and Equation (10) can be approximated as:

$$n_2\kappa| \cong \frac{B\Gamma(\omega/2)}{(\omega_o^2-\omega^2)^2 + (\Gamma\omega)^2} \cdot \frac{1}{n_{2b}} \quad (11)$$

By using Equation (3) and converting the frequency to wavelength, Equation (11) becomes:

$$B = \left[\frac{n_{2b}\omega_a}{2\pi(\lambda_a)^2}\right] \alpha_o C_d \quad (12)$$

where
$\omega_a, \lambda_a, \alpha_o$ = the half-width (in wavelength units), the peak wavelength, and the peak absorption coefficient of the weak absorption band, respectively,
and
$C_d$ = the concentration of the dilute solution of the absorbing species.

Note that $\Gamma$, the half-width in wave number units, equals $\omega_a/(\lambda_a)^2$.

Equations (9) and (10) can be related to the interface reflectance in the ATR analyzer by substituting the value of B from Equation (12), dividing by $n_1^2$ and converting frequency to wavelength.

The following relationships result:

$$D_1 \equiv n_{21}^2(1-\kappa^2) = \left(\frac{n_{2b}}{n_1}\right)^2 + \frac{n_{2b}}{n_1^2} \cdot \frac{\alpha_o}{2\pi}\left[\frac{y_o}{1+\left(\frac{y_o}{\lambda}\right)^2}\right] C \quad (13)$$

and $$D_2 \equiv 2n_{21}^2\kappa = \frac{n_{2b}}{n_1^2} \cdot \frac{\alpha_o}{2\pi}\left[\frac{\lambda}{1+\left(\frac{y_o}{\lambda}\right)^2}\right] C \quad (14)$$

where $$y_o = \frac{\lambda^2 - (\lambda_a)^2}{\omega_a}.$$

and $D_1$ and $D_2$ are called first and second dispersion factors.

It is readily apparent that both $n_{21}$ and $\kappa$ are complicated functions of concentration C. However, Equations (13) and (14) implicitly define the extent of refractive index dispersion and the shape of the distribution as a function of concentration C in terms of measurable parameters ($\alpha_o$, $\lambda_a$, $\omega_a$, $n_1$, $n_{2b}$). The use of small computers which are becoming readily available, (a typical example being the Hewlett-Packard 9100B), simplifies the calculation procedure and permits many solutions to the equations to be achieved in a very short time.

CALCULATION OF ATR RESPONSE

As shown, the dependence of ATR response on concentration is affected by the refractive index dispersion, and initially it appeared to be quite a complicated problem to calculate this response. Fortunately, it was observed that the reduced parameters, ($P_1$) and ($P_2$) in Equations (5) and (6), needed to calculate the reflectance in Equations (4a, b and c) are expressed in terms of the dispersion factors $D_1$ and $D_2$ and as shown above, these dispersion factors can be calculated from Equations (13) and (14) from measurable parameters. Thus, ATR response can be calculated without having to solve for $n_{21}$ and $\kappa$ explicitly from Equations (13) and (14).

Calculation is, therefore, greatly simplified and entails the following steps:

I. For values of C in the range of interest, calculate $D_1$ and $D_2$ from Equations (13) and (14) as functions of $\lambda$ ranging above and below $\lambda_a$.

II. Calculate ($P_1$) and ($P_2$) from Equations (5) and (6) for a value of $\theta$ above critical ($\theta_c$). [For example, in FIG. 5B, the value chosen for $\theta$ was 75° with an indicated $\theta_c = 64.2$]. dd III. Calculate reflectance of single reflection from Equations (4a, b, c) as a function of $\lambda$ for values of C.

IIIA. When required, calculate reflectance for the applicable number of multiple reflections from Equation (7a, b, c) as a function of $\lambda$ for values of C.

FIG. 6A is a plot of r vs. $\lambda$ for values of C ranging from 1 to 40% (the upper set for 1–10% with 1% intervals, and the lower set for 1–40% with 5% intervals) as determined by following the steps I–III above for the values of $\lambda_a$, $\omega_a$, $\alpha_o$, $n_1$, and $n_{2b}$, for concentration levels indicated on each curve. Note that the peak of the low concentration curve ($C = 0.05$) is at a $\lambda$ of 4.42 $\mu$m which is close to the absorption peak $\lambda_a$ of 4.40 $\mu$m. The peak for $C = 0.40$, however, had broadened and shifted to a $\lambda$ of 4.50 $\mu$m. The extent of the shift, viz. 0.10 $\mu$m, is seen to be significant when it is remembered that the absorption band half-width, $\omega_a$ for this case is 0.08 $\mu$m as shown.

As discussed in the description of FIG. 4A, the wavelength distribution of the energy with which the sample is irradiated also has a distinct contribution to the measurement sensitivity. Sample irradiation with a strictly monochromatic source even if possible would result in a loss in sensitivity when there is a shift in response of the sample with concentration due to dispersion effects, as just discussed. Thus, it is advantageous to irradiate the sample with energy from a source, whereby through use of a filter the desired wavelength distribution is produced with an appropriately chosen peak transmission wavelength and bandwidth. Referring again to FIG. 4B the area under the filter curve represents the total irradiating energy, and since the area under bi-lobal curves A and B represents the energy remaining after absorption, this remaining energy is sensed and used to determine sample concentration, since the area (energy) reduction is a result of the absorption by the sample. Intuitively, it can be visualized that a reduction in filter bandwidth would reduce the areas of the lobes and increase the sensitivity in this transmission example. However, such intuitive reasoning applied to the situation in which ATR dispersion effects are encountered can be very misleading and further analysis forms a more concrete basis for filter selection.

If a Gaussian wavelength distribution is assumed for the filter, the transmission spectrum of the filter $T_\lambda$ would be:

$$T_\lambda = T_o \exp\left[\frac{-(\lambda - \lambda_f)^2}{G(\omega_f)^2}\right] \quad (15a)$$

where $T_o$ = peak filter transmission, $\lambda_f$, $\omega_f$ = peak wavelength and half-width of filter $G \approx 0.3607$; a numerical constant $\cong 1/(4 \ln 2)$ Or, this can also be expressed as the filter transmission, $H_f$, as follows:

$$H_f = \frac{T_\lambda}{T_o} = e^{-\left[\frac{(\lambda-\lambda_f)^2}{G(\omega_f)^2}\right]} \quad (15b)$$

The calculation of the response of the system in the ATR mode of operation can now be expressed in terms of the "effective transmission," $T_e$, or "effective absorbance," $A_e$, by comparing the analyzing energy level ($H_f$) at a wavelength and the energy reduction ($r_p$ or $R_p$) in the sample at that wavelength. This comparison is carried out through a wavelength range encompassing that of the filter and of the absorption band and the results summed. The $T_e$ and $A_e$ values can be determined from the following equations:

$$T_e = \frac{\Sigma_\lambda H_f R_p}{\Sigma_\lambda H_f}, \text{ and} \quad (16a)$$

$$A_e = -\log_{10} \frac{\Sigma_\lambda H_f R_p}{\Sigma_\lambda H_f} = -\log_{10} T_e \quad (16b)$$

where $H_f$ = the filter transmission from Eq. 15b.

$R_p$ = reflectance r from Eq. 4 for single reflection or R from Eq. 7 for multiple reflection. The polarization, p, ($\perp$, $\parallel$, or natural) which is used will determine whether 4a, b, or c or 7a, b, or c will be applicable.

$\lambda$ = the variable wavelength and the summations, $\Sigma_\lambda$ are calculated in small wavelength increments covering the effective range of the filter.

Figure 6B:
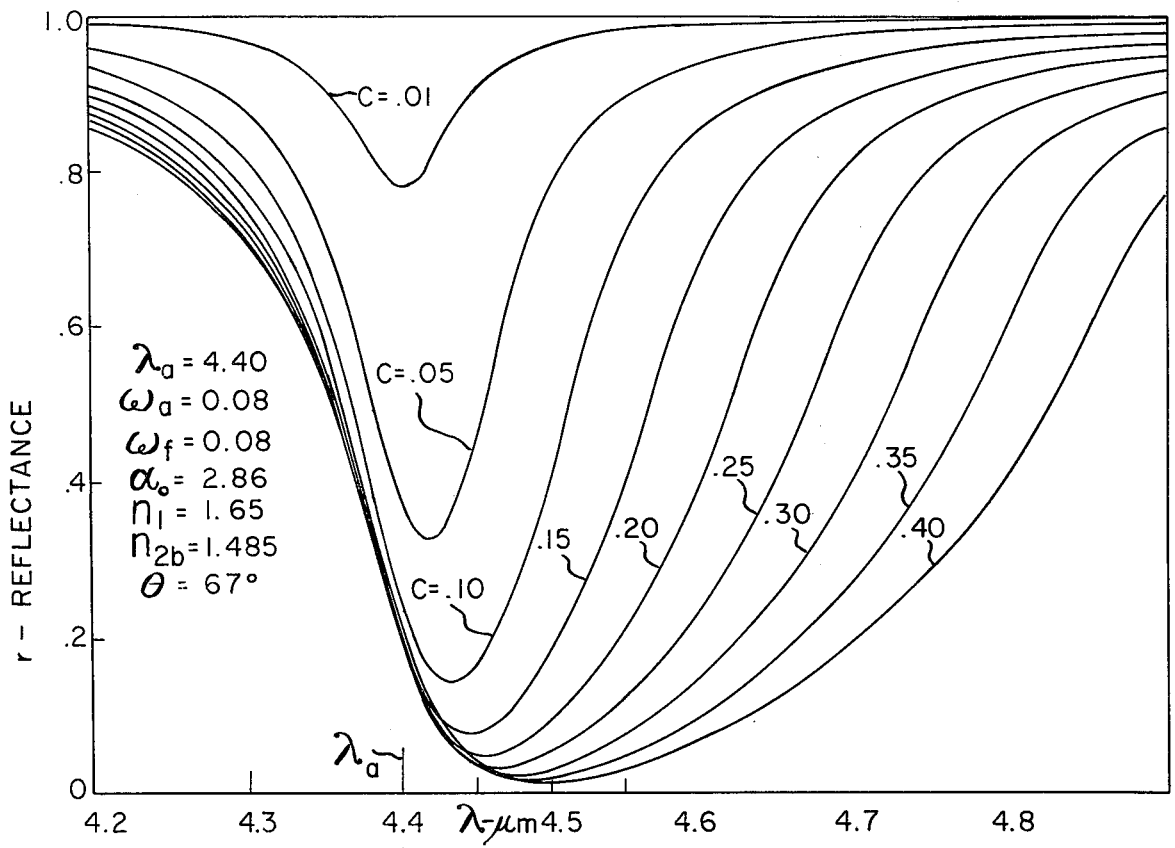
FIG. 6B repeats the lower family of curves from FIG. 6A and provides below this on the same wavelength scale a plot of filter transmission versus wavelength and of combined (filter plus solution) transmission on the same wavelength scale similar to 4B; here the filter has no wavelength offset but the reflectance curves of FIG. 6A are used to compute the filter plus solution curves for varied concentrations as shown.
Figure 6B:
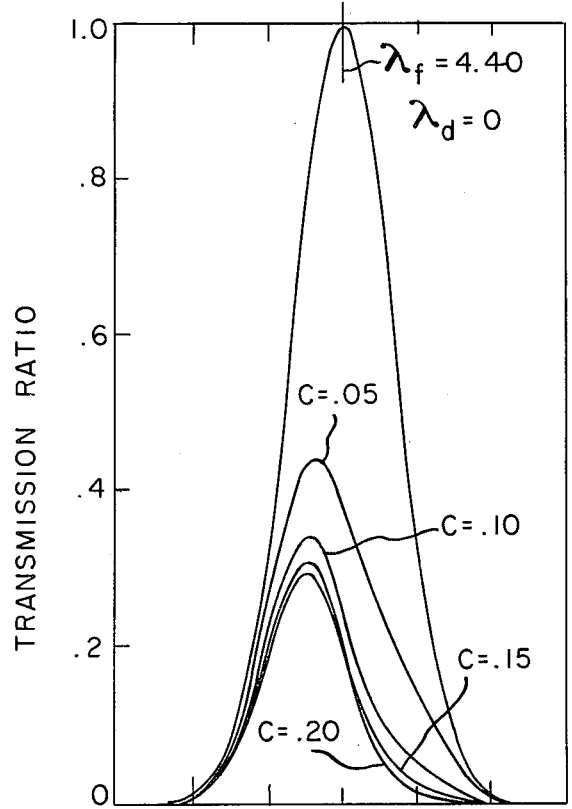
Figure 6C:
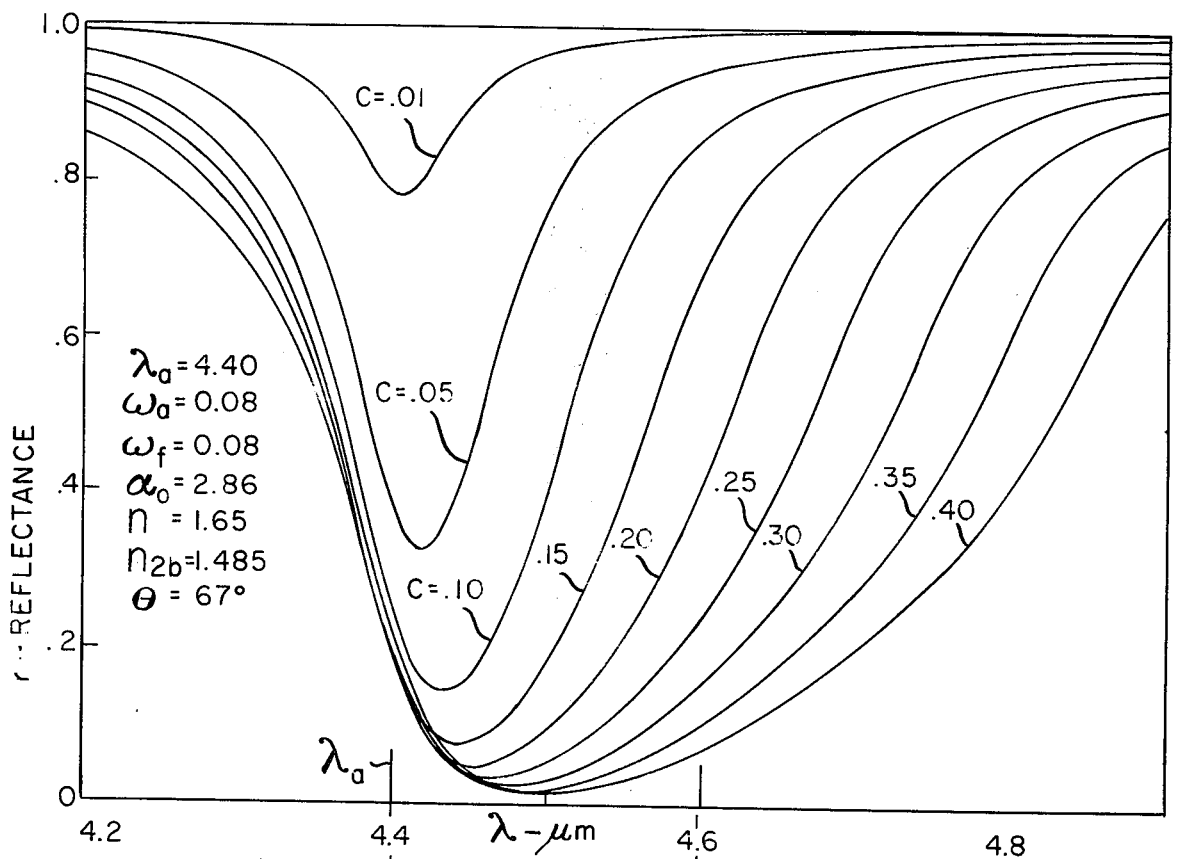
FIG. 6C is a similar plot except that now the filter has a peak wavelenth of 4.48 micrometers (a wavelength offset $\lambda_d = 0.08$)
Figure 6C:
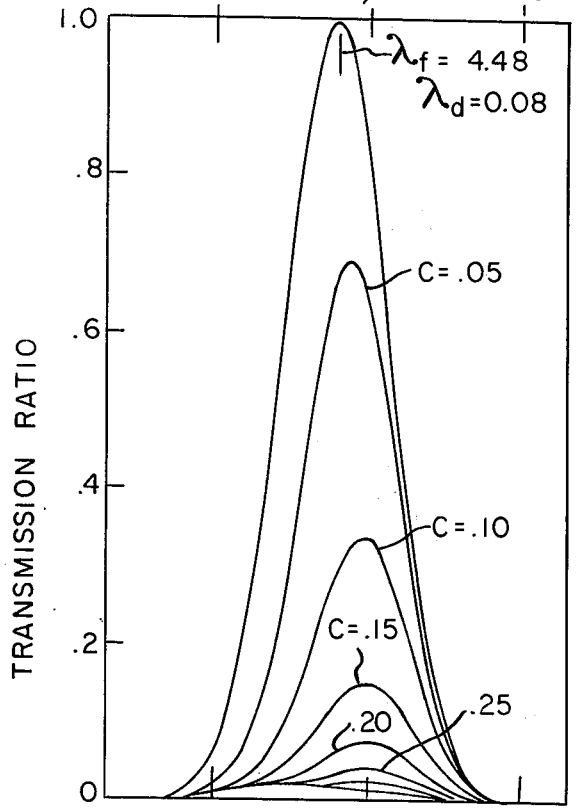
Figure 6D:
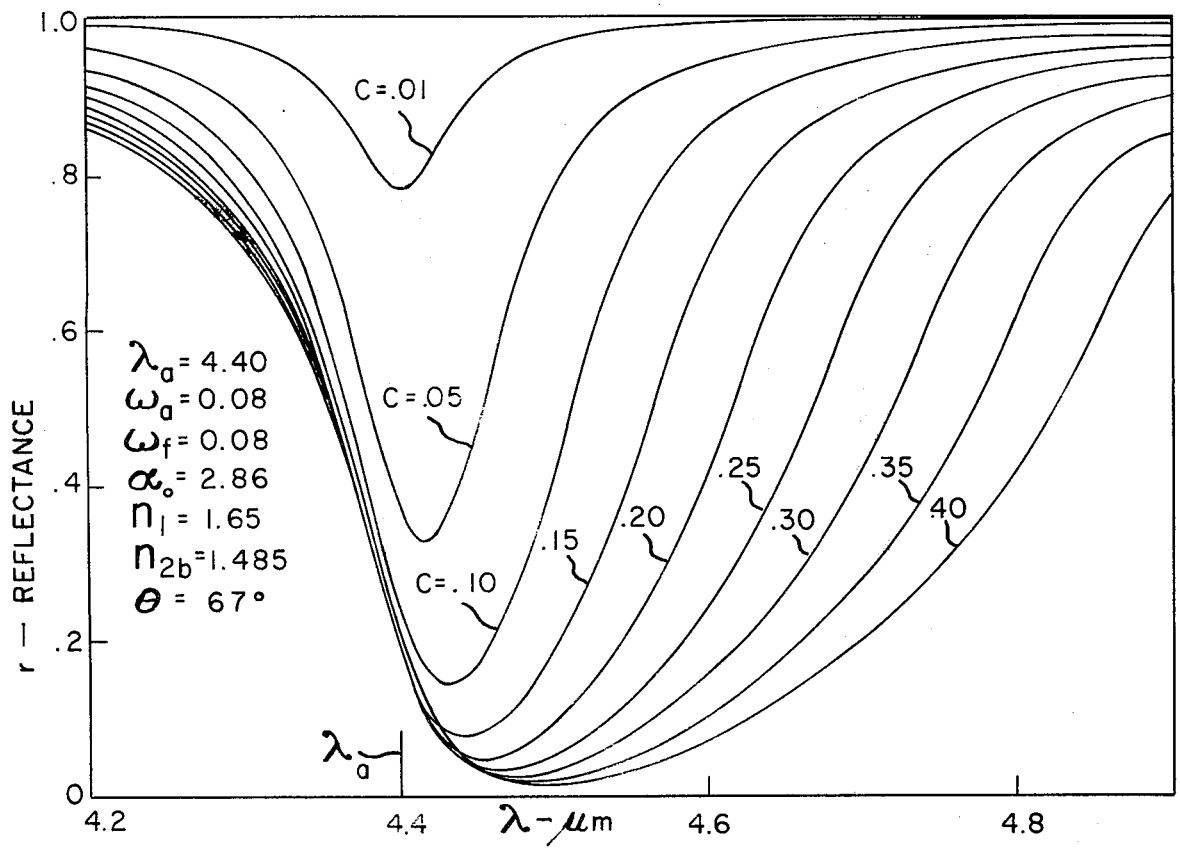
FIG. 6D is also a similar curve to FIG. 6B except now the $\lambda_f = 4.56$ ($\lambda_d = 0.16$)
Figure 6D:
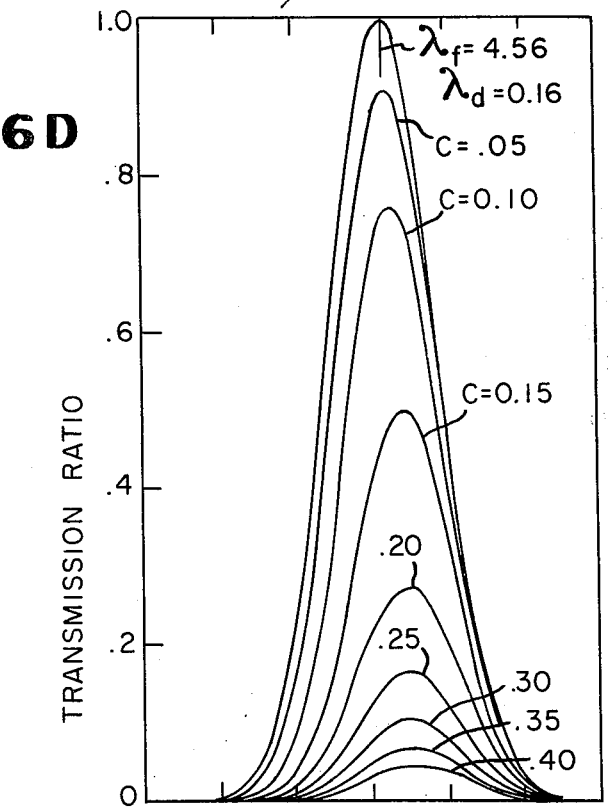

FIG. 6B is a plot similar to FIG. 4B with transmission curves, using a filter with a peak wavelength $\lambda_f = 4.40$, whereby with $\lambda_d = \lambda_f - \lambda_a$ and thus $\lambda_d = 0$, shown in relation to reflectance curves of FIG. 6A. Similarly, FIG. 6C is for the response with a filter with $\lambda_f = 4.48$ ($\lambda_d = 0.08$), and FIG. 6D is for the response with a filter with $\lambda_f = 4.56$ ($\lambda_d = 0.16$).

Figure 7:
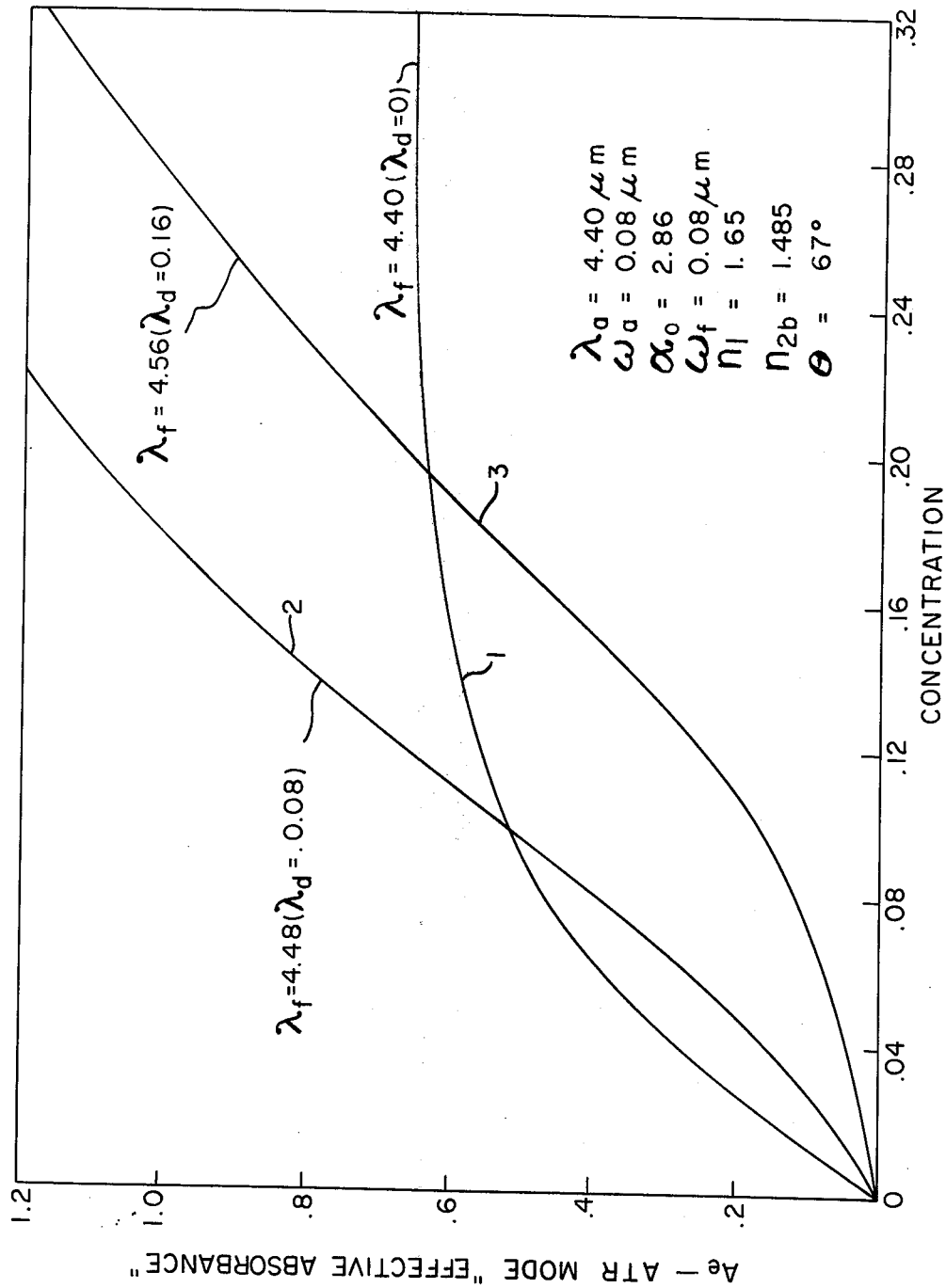
FIG. 7 contains three plots of effective absorbance versus concentration which are calibration curves for three levels of filter wavelength and therefore wavelength offset.

Instrument calibration curves plotted in terms of $A_e$ vs. C are shown in FIG. 7 for the values of $\lambda_d$ illustrated in FIGS. 6B, C, D. It is shown (curve 1) that for low concentration levels that zero offset provides good sensitivity. This is to be expected since the dispersion effects at low concentration levels are minimal and the ATR analyzer would have a response similar to a normal transmission analyzer. This set of curves clearly shows that improved response for higher concentrations or for strong absorption levels (where ATR provides the effective "thin sample") is achieved by using an intentional mismatch between the irradiation wavelength and the absorption band wavelength and that the mismatch should be such that the irradiation wavelength is longer than the absorption band wavelength.

The choice of mismatch, from the most elementary consideration of the data shown in FIG. 7 would be decided by consideration of the slope of the calibration curve in the region of concentration of interest. If low to medium concentrations are to be monitored, $\lambda_d$ values between those of curve 1 and curve 2 would be appropriate. If an essentially uniform response through a wide range of concentrations is required, then a choice of $\lambda_d$ as represented by curve 2 would be appropriate for a concentration range from about 6–16% for example. Similarly, curve 3 indicates improved response for high range concentration, e.g., 16–30%, with reasonable linearity.

Figure 8:
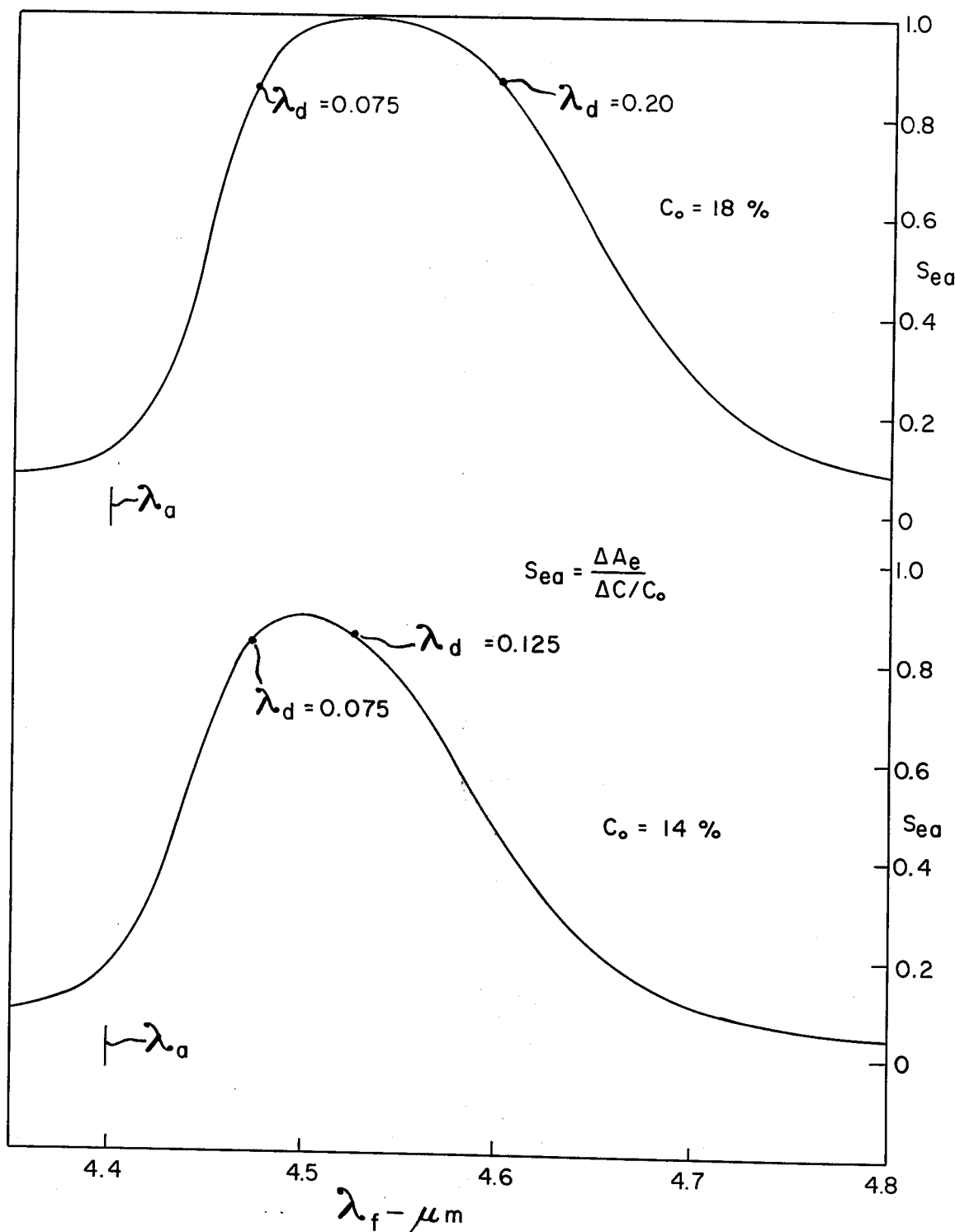
FIG. 8 contains two plots of $S_{ca}$ versus wavelength $\lambda_f$; the upper plot for $C_o = 18\%$ and the lower plot for $C_o = 14\%$. These plots illustrate the peaking of the "slope" curves in wavelength ranges from which a choice of filter wavelength and, therefore, wavelength offset can be made to optimize sensitivity for the illustrated conditions.

Since the slope of the curves of FIG. 7 are indicative of sensitivity, when monitoring to maintain a mixture in a condition where the concentration of a constituent should be maintained relatively constant at a given level (for example, in the present process employed for illustration the MDI concentration is desired to be maintained at 18% ±0.5%) the choice of wavelength offset is simplified by computing and plotting a slope parameter $S_{ea}$, which is equal to $$\frac{\Delta A_e}{\Delta C / C_o}$$

as a function of wavelength. Referring to FIG. 7, it can readily be seen that at a concentration of 18% the sensitivity with $\lambda_d = 0$ (Curve 1) is very poor since the calibration curve has "flattened out" in this range of concentration. Curve 2 with $\lambda_d = 0.08$ and curve 3 with $\lambda_d = 0.16$ each have apparently good sensitivity in the 18% range as indicated by the slope of these curves at that concentration. Selection of a wavelength offset value by inspection of such calibration curves can provide improved sensitivity; however, as shown in FIG. 8, plots of $S_{ea}$ vs. $\lambda_f$ exhibit distinct maxima of the slope parameter. The upper plot of FIG. 8 shows that, for $C_o = 18\%$, $\lambda_d = (\lambda_f - \lambda_a)$ from essentially 0.075 to 0.20 will have a maximized sensitivity. The lower plot of FIG. 8 shows a narrow range of $\lambda_d$ from essentially 0.075 to 0.125 for $C_o = 14\%$.

It is obvious that a similar choice of $\lambda_d$ can be made by considering calibration curves plotted in terms of "effective transmission" $T_e$ and the corresponding slope parameter $S_{et}$ which is equal to $$\frac{\Delta T_e}{\Delta C / C_o}.$$

FIGS. 6 and 7 show that concentration levels up to 40% can be monitored with the parameters shown. When a higher concentration range is to be monitored, it would be advantageous to choose a larger angle of incidence $\theta$ which will have the effect of diminishing the effective sample thickness of the more absorbent higher concentration sample. The calculations should be repeated for this larger $\theta$, the appropriate calibration plots prepared, and the selection of an appropriate $\lambda_d$ value for optimizing sensitivity by the methods discussed for the previous example.

In summary, the technique for selecting the appropriate wavelength difference between the transmission peaks of the filter and the absorption peak of the absorption band of the chemical monitored is as follows:

I. For the assumed value of concentration C, calculate a first dispersion factor $D_1$ and a second dispersion factor $D_2$ each as a function of wavelength ranging above and below the peak wavelength of the absorption band characteristic of the constituent to be monitored;

II. Calculate a first and second reduced parameter $P_1$ and $P_2$ for the value of the angle of incidence of radiation $\theta$ which has been chosen.

III. Calculate the appropriate reflection ratio for the polarization configuration to be employed in the instrument and for the single or multiple number of reflections characteristic of the prism employed in the apparatus as a function of the wavelength for the value of concentration, C, to be monitored;

IV. Prepare a plot of reflection ratio as a function of wavelength. The difference between the wavelength at the peak of this plot and the absorption peak $\lambda_a$ provides a first approximation of the wavelength offset that should be introduced by proper selection of the filter in front of the light source for the ATR instrument.

V(a). Assuming a Gaussian wavelength distribution for the filter transmission spectrum, calculate the response of the system in terms of effective absorbance, $A_e$, through a wavelength range encompassing that of the filter and of the absorption band for an appropriate range of solution concentration and for a series of appropriate filter wavelength offset values, $\lambda_d$. A plot of $A_e$ vs. concentration for each selected wavelength offset, $\lambda_d$, provides a series of calibration curves which, by inspection, will permit selection of the offset, $\lambda_d$, whereby the response (as indicated by the particular calibration curve) will be sufficiently linear and have reasonable sensitivity (slope of curve) in and through the range of concentration to be monitored.

V(b). When measurement of concentration changes about a particular concentration level, $C_o$, is the process monitoring requirement, the choice of appropriate filter wavelength offset, $\lambda_d$, for improved response sensitivity is determined by calculating $$\frac{\Delta A_e}{\Delta C / C_o}$$

to provide a parameter $S_{ea}$ (which is in effect related to the slope of the calibration curves at $C_o$). Now plot $S_{ea}$ versus $\lambda_f$ to provide a curve where the maximum of the curve indicates the peak wavelength required for the filter and consequently the offset range in which the optimization of improved measurement can be expected.

In steps V(a) and V(b), similar selection of $\lambda_d$ can be made by calculating the effective transmission, $T_e$. In step V, a plot of $T_e$ versus C for selected $\lambda_d$ values will also provide a series of calibration curves (in terms of $T_e$ instead of $A_e$) from which $\lambda_d$ can be selected by inspection as described for $A_e$ versus C. Similarly in V($a$), a slope related parameter, $S_{et}$ would be provided by calculating $$\frac{\Delta T_e}{\Delta C / C_o}.$$

Plotting $S_{et}$ versus $\lambda_f$ would provide a curve with a maximum indicative of $\lambda_d$ for the optimized measurement sensitivity.

The choice of $T_e$ or $A_e$ is optional; some workers in the field can relate more readily to absorbance units than transmission units and vice versa.

The usefulnes of this invention has been proven in an application to a manufacturing process wherein, as noted above, the concentration of MDI is monitored in order to control the MDI to PEG ratio. Before the use of ATR-IR, laboratory analyses were necessary which resulted normally in a 2½ hr. lag time between sampling and the analytical results. The sensitivity of this laboratory analysis technique was found to be about ±0.03%. When the ATR-IR apparatus was used in its conventional form, the response time was found to be one minute and the sensitivity approximately ±0.02. When the improved ATR-IR instrument of this present invention was employed, the response time remained at 1 minute and the sensitivity was improved to a level of about ±0.005%. It is obvious that improved sensitivity of this extent results in increased product quality and reduced variability in the product. Although the invention is illustrated in terms of monitoring the concentration of MDI, many other solution types where a distinctive infrared band is available may be monitored by means of the apparatus improved according to this invention. It is apparent that various changes and modifications can be made without departing from the spirit of the present invention which is intended to be limited only by the scope of the appended claims.

1. In a method for operating an attenuated total reflection infrared system for measuring the concentration of a constituent in a liquid process stream, said constituent having a characteristic absorption band with a peak wavelength, which when viewed by internal reflection is distorted toward longer wavelengths as a consequence of refractive index dispersion and, wherein a sample of the stream is irradiated with a beam of radiation the improvement comprising: intentionally irradiating said sample with a beam of radiation offset to a range of wavelengths longer than the characteristic absorption band peak wavelength of said constituent in place of a beam centered at said peak wavelength thereby compensating for the distortion of the absorption band to improve the sensitivity of the system.

2. The method as defined in claim 1, said characteristic absorption band peak wavelength being in the range of from about 3 to about 10 micrometers.

3. The method as defined in claim 1, said constituent having a characteristic absorption band peak wavelength of 4.40 micrometers and being intentionally irradiated at a wavelength of 4.48 micrometers.

4. The method as defined in claim 1, said constituent having a characteristic absorption band peak wavelength of 4.40 micrometers and being intentionally irradiated at a wavelength of 4.56 micrometers.

5. In a method for operating an attenuated total reflection infrared system for measuring the concentration of a constituent in a liquid process stream, said constituent having a characteristic absorption band with a peak wavelength, which when viewed by internal reflection is distorted toward longer wavelengths as a consequence of refractive index dispersion and wherein a sample of the stream is irradiated with a beam of radiation, the improvement comprising: intentionally analyzing the beam of radiation emanating from the sample over a range of wavelengths longer than the characteristic absorption band peak wavelength of said constituent in place of analyzing over a range of wavelengths centered at said peak wavelength thereby compensating for the distortion of the absorption band to improve sensitivity of the system.

* * * * *

UNITED STATES PATENT OFFICE
CERTIFICATE OF CORRECTION

PATENT NO. : 3,902,807
DATED : September 2, 1975
INVENTOR(S) : Sydney Winn Fleming, Wallace Wen-Chuan Yau It is certified that error appears in the above-identified patent and that said Letters Patent are hereby corrected as shown below:

Col. 2, line 7 - "ART-IR" should read -- ATR-IR --.

Col. 2, line 29 - "absorptiion" should read -- absorption --.

Col. 2, line 40 - "20%" should read -- 40% --.

Col. 2, line 43 - "n," should read -- $n_1$ --.

Col. 4, line 60 - insert after "transmitted", -- to --.

Col. 5, line 7 - delete "it".

Col. 5, line 43 - Equation should be numbered -- (1) --.

Col. 6, line 23 - equation (2) should read -- $n_2' = n_2(1-i\kappa)$ --.

Col. 6, line 27 - insert after "and" -- $\kappa$ --.

Col. 6, line 28 - insert after "term," -- $\kappa$ --.

Col. 6, line 29 - delete "Equation 1" and insert -- Lambert-Beer Law --.

UNITED STATES PATENT OFFICE
CERTIFICATE OF CORRECTION

PATENT NO. : 3,902,807
DATED : September 2, 1975
INVENTOR(S) : Sydney Winn Fleming, Wallace Wen-Chuan Yau It is certified that error appears in the above-identified patent and that said Letters Patent are hereby corrected as shown below:

Col. 6, line 60 - insert after "$n_1$", -- , $\kappa$ --.

Col. 6, line 65 - Change

"$\{1/2[n_{21}^2(1-\kappa^2)-\sin^2\theta]^2 + 4n_{21}^4\kappa^2\}^{1/2}$" to read to read -- $1/2\{[n_{21}^2(1-\kappa^2)-\sin^2\theta]^2 + 4n_{21}^4\kappa^2\}^{1/2}$ --.

Col. 7, line 4 - Change "$-\sin^2\theta]^2 + 4n_{21}^4\kappa^2$ )" to read -- $-\sin^2\theta]^2 + 4n_{21}^4\kappa^2\}^{1/2})^{1/2}$ --.

Col. 7, line 31 - after "particular," delete "in" and insert -- is --.

Col. 8, line 1 - change "$n_2^2(1-^2)$" to read -- $n_2^2(1-\kappa^2)$ --.

Col. 8, line 8 - change "$n_2^2=\kappa$" to read -- $n_2^2\kappa=$ --.

Col. 8, line 22 - change "$n_2\kappa|$" to read -- $n_2\kappa$ --.

Col. 9, line 27 - insert after "$n_{21}$ and" -- $\kappa$ --.

Col. 9, line 37 - delete "dd".

Col. 10, line 32 - change right hand side of equation 15b to read -- $\exp\left[\dfrac{-(\lambda-\lambda f)^2}{G(\omega f)^2}\right]$

Signed and Sealed this

Fourteenth Day of September 1976

[SEAL]

Attest:

RUTH C. MASON
*Attesting Officer*

C. MARSHALL DANN
*Commissioner of Patents and Trademarks*